United States Patent
Aoki

[15] 3,677,685
[45] July 18, 1972

[54] MOLD CLAMPING MECHANISM OF INJECTION MOLDING MACHINE

[72] Inventor: Katashi Aoki, 6037, Oaza Minamijo, Hanishina-gun, Nagano-ken, Sakakimachi, Japan

[22] Filed: April 15, 1971

[21] Appl. No.: 134,382

[30] Foreign Application Priority Data

April 22, 1970 Japan..................................45/33998

[52] U.S. Cl..............................425/450, 425/453, 425/457
[51] Int. Cl.........................................B29f 1/06, B30b 1/32
[58] Field of Search..................................425/450, 453, 457

[56] References Cited

UNITED STATES PATENTS

| | | | |
|---|---|---|---|
| 2,319,479 | 5/1943 | Ryder | 425/450 |
| 3,263,277 | 8/1966 | Ohlendorf et al. | 425/450 |
| 3,270,372 | 9/1966 | Herse | 425/450 |
| 3,456,297 | 7/1969 | Avdreasson | 425/450 |

Primary Examiner—J. Howard Flint, Jr.
Attorney—David H. Semmes

[57] ABSTRACT

A mold clamping mechanism of injection molding machine in which a high pressure mold clamping cylinder, a low pressure high speed mold closing cylinder and a high pressure switching cylinder are arranged in a series relation, said mold clamping cylinder and mold closing cylinder are interconnected with each other by way of an opening to pass the pressure oil, the forward portion of a high pressure switching piston in said switching cylinder is inserted through said opening to close said opening, a mold clamping ram in said clamping cylinder is forced ahead to close the mold by advancing a high speed mold closing piston in said mold closing cylinder, and said mold clamping ram is pushed by the supply of pressure oil through a passage in said switching piston to clamp the mold tightly.

5 Claims, 8 Drawing Figures

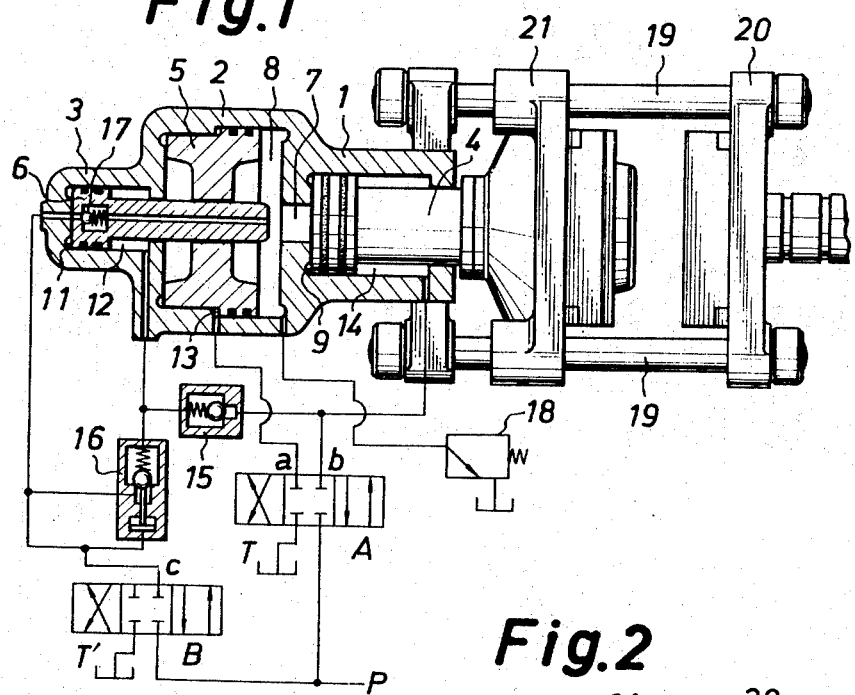
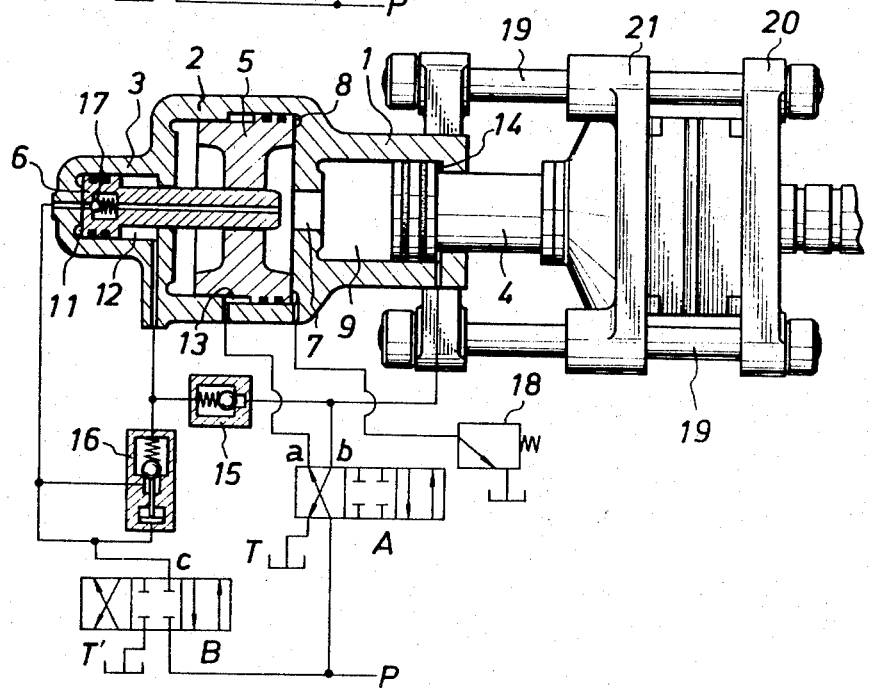
INVENTOR.
BY KATASHI AOKI

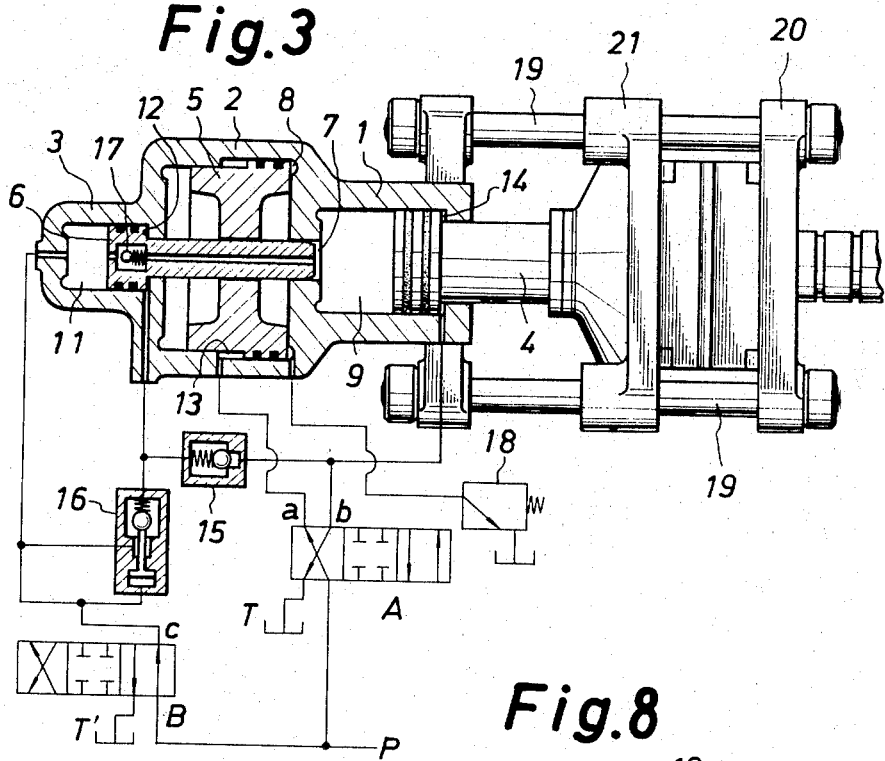
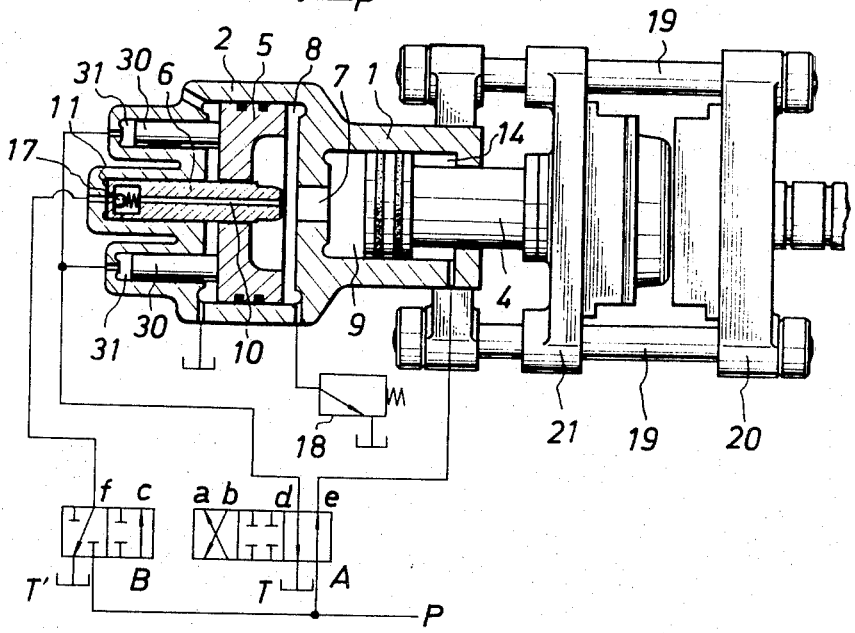

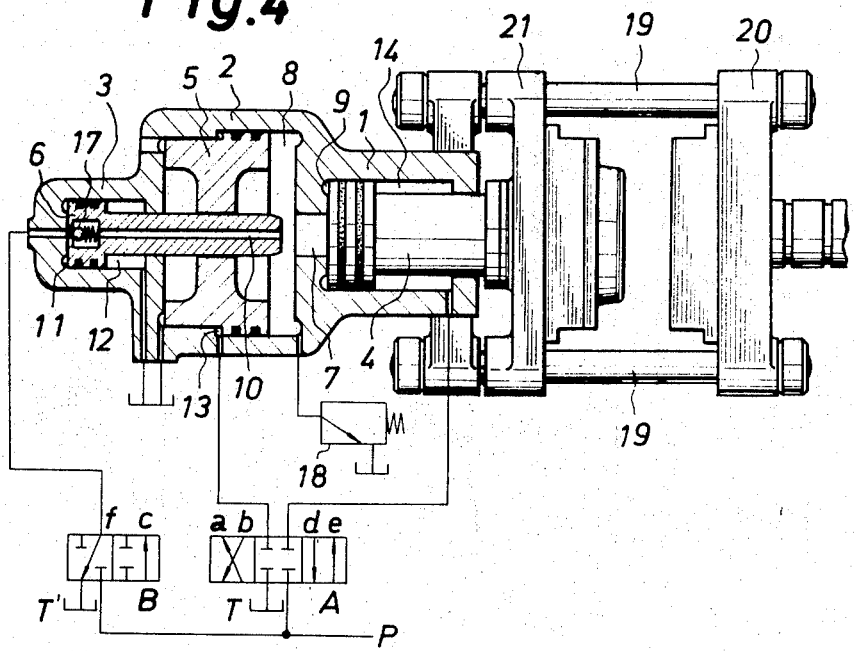
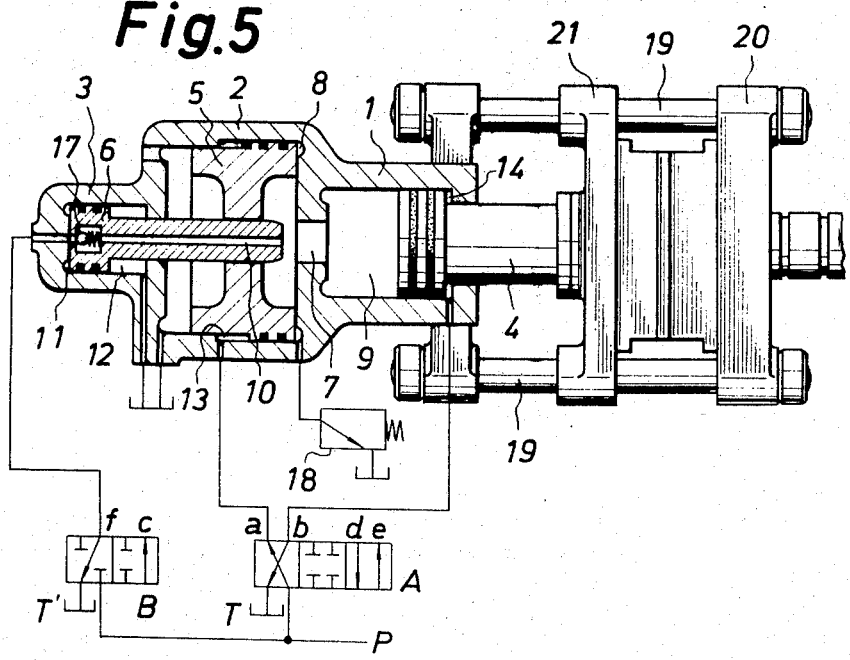

Patented July 18, 1972
3,677,685
4 Sheets-Sheet 4
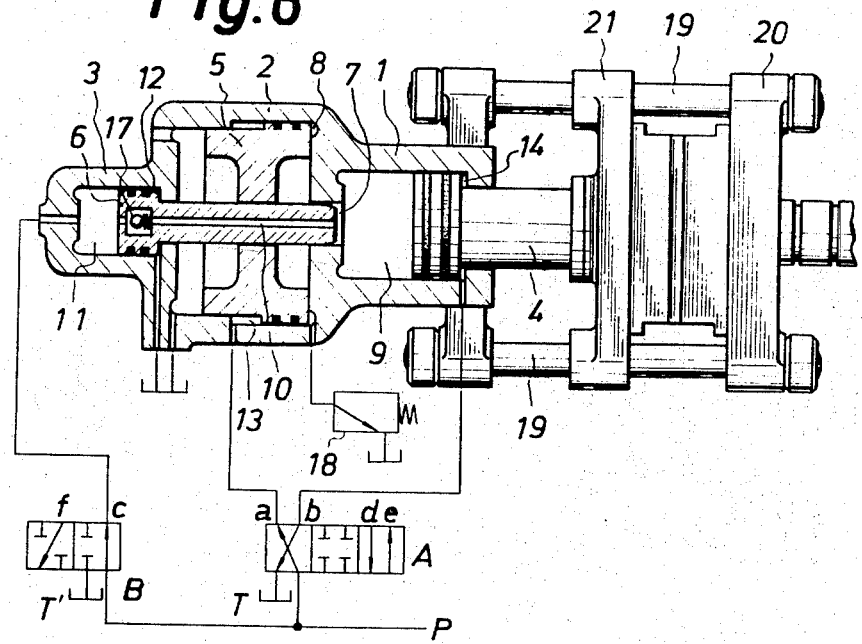
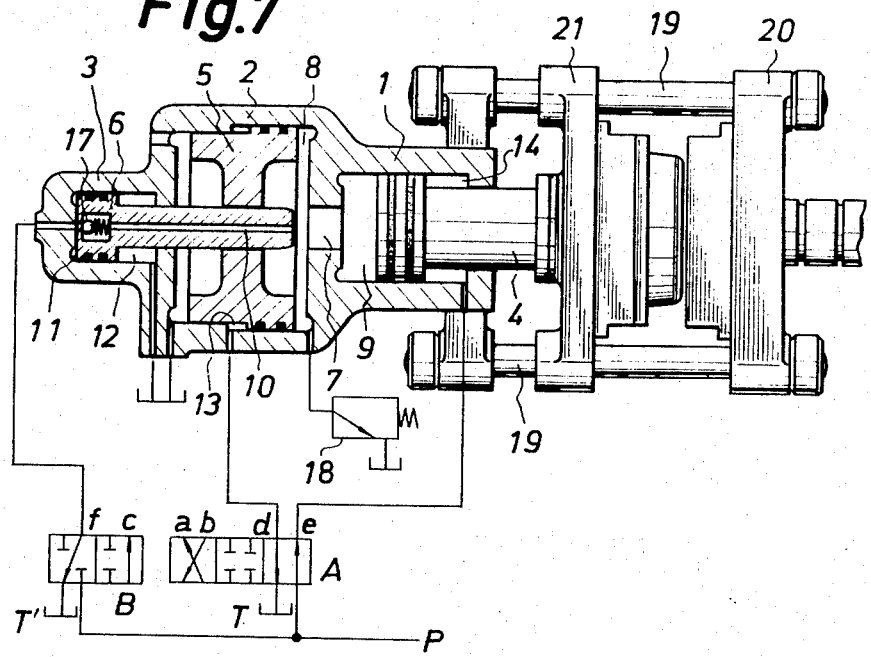
INVENTOR.
BY KATASHI AOKI
David N. Semmes

MOLD CLAMPING MECHANISM OF INJECTION MOLDING MACHINE

This invention relates to a mold clamping mechanism of an injection molding machine.

Further the invention relates to a mold clamping mechanism to open and close and further clamp the mold with oil pressure rapidly and tightly.

In the injection molding machine of the type in which a set of the molds are clamped directly by hydraulic pressure, several types of rapid mold clamping mechanisms have been known. However, in the ordinary mold clamping mechanisms of direct pressure type, when the mold is driven ahead rapidly by a high pressure piston, a lower pressure portion is formed in the cylinder because the pressure oil is passed through a narrow passage into the cylinder, (said low pressure portion is referred to as "minus pressure portion" hereinafter). And as the mold clamping speed increased, the minus pressure portion may come into question.

By this minus pressure, the oil in the oil tank is introduced into the clamping cylinder, when the mold is closed. The suction by the minus pressure causes the formation of bubbles in the oil and further expands the existing bubbles.

When a high pressure oil is supplied into the system containing a large quantity of said newly formed or expanded bubbles, a sufficient quantity of the oil for breaking the bubbles is necessary. Therefore, the time required for the high pressure clamping step is lengthened and a high speed clamping can not be carried out, accordingly the reduction of the time for injection cycle can not be attained. Further, the formation of bubbles and expansion and breaking of bubbles cause the degradation of the pressure oil as used.

The present invention relates to a mold clamping mechanism which can settle the above-described problems, and by using the mechanism of the present invention, the mold can be closed and clamped rapidly and tightly without the formation of bubbles in the pressure oil system.

These and other objects and features of the invention will become more apparent from the following description taken in connection with the accompanying drawings in which:

FIGS. 1 to 3 are schematic illustrations, partly in side elevation and partly in section of the main parts of the mold clamping mechanism of the invention, in which FIG. 1 shows that the mold is opened, FIG. 2 shows that the mold is closed and FIG. 3 shows that the mold is clamped with high pressure;

FIGS. 4 to 7 are schematic illustrations, partly in side elevation and partly in section of the main parts of the mold clamping mechanism of another embodiment of the invention, in which FIG. 4 shows that the mold is opened, FIG. 5 shows that the mold is closed, FIG. 6 shows that the mold is clamped with high pressure and FIG. 7 shows that the mold is partly opened; and FIG. 8 is a schematic illustration, partly in side elevation and partly in section of the main parts of the mold clamping mechanism of still another embodiment of the invention in which some parts are further changed.

Referring now to the FIGS. 1 to 4, inclusive, in which the first embodiment of the mold clamping mechanism of the invention is shown. The clamping mechanism is composed of a high pressure mold clamping cylinder 1, a high speed mold closing low pressure cylinder 2 and a high pressure switching cylinder 3, which are arranged in a straight line and in a series relation.

Said high pressure mold clamping cylinder 1 is fixed to the machine bed (not shown), and is connected with the stationary platen 20 by four tie bars 19 and a high pressure mold clamping ram 4 in the mold clamping cylinder 1 is connected with the movable platen 21. Said stationary platen 20 and movable platen 21 are provided with halves of the mold, respectively.

On the wall portion between the high pressure mold clamping cylinder 1 and the high speed mold closing cylinder 2 having a low pressure piston 5, and opening 7 is provided, through which the forward portion of the high pressure switching piston 6 is inserted. The high pressure mold clamping cylinder chamber 9 communicates with the high speed mold closing cylinder chamber 8 through the above-mentioned opening 7 when the switching piston 6 is retracted. The stroke of the low pressure piston 5 is short, and the stroke of the high pressure mold clamping ram 4 is several times of that of the low pressure piston 5. The effective volume of the cylinder chamber 8 when the low pressure piston 5 is retracted, is the same as the effective volume of the mold clamping cylinder chamber 9 when the mold clamping ram 4 is forced ahead. In other words, the volumes of pressure oil for the aforementioned two cylinders are the same with each other.

At the center of the low pressure piston 5 for rapid closing of the mold, a cylindrical opening is provided, through which the high pressure switching piston 6 is slidably inserted.

A high pressure switching check valve 17 and a passage for the high pressure oil 10 are provided on the axis of the high pressure switching piston 6.

In the pressure oil circuit for the above-mentioned mold clamping mechanism, the cylinder chamber 14 of the high pressure mold clamping cylinder 1 and the cylinder chamber 12 of the high pressure switching cylinder 3 are interconnected through a check valve 15 and that line is further communicated with a change-over valve A for mold closing and opening, which is connected to the cylinder chamber 13 of the low pressure mold closing cylinder 2 for rapid mold closing. The cylinder chambers 11 and 12 of the high pressure switching cylinder 3 which are partitioned with the low pressure piston 5, are interconnected with each other through a pilot check valve 16, and that circuit is further provided with a high pressure change-over valve B. The numeral 18 is a relief valve which is connected with the cylinder chamber 8 of the high speed mold closing cylinder 2.

In the following, the operations of the mechanism of the present invention will be explained.

For the first step, the change-over valve (A) is turned from the state as shown in FIG. 1 to the state of FIG. 2, thus the mold closing circuits, P → a and b → T are formed. Then the pressure oil is supplied into the cylinder chamber 13 of the high speed mold closing cylinder 2 to force ahead the low pressure piston 5 in the direction of the mold closing. The pressure oil in the cylinder chamber 8 is transferred into the cylinder chamber 9 of the mold clamping cylinder 1 by way of the opening 7 as said piston 5 is forced ahead, thereby the high pressure clamping ram 4 is forced ahead rapidly as shown in FIG. 2. Thus the mold is closed rapidly. In the next step, when the clamping ram 4 is advanced for a certain stroke, the aforementioned high pressure change-over valve B is turned to change the oil circuit into P → c. Thereby the pressure in the cylinder chamber 11 of the high pressure switching cylinder 3 is increased and while the pilot check valve 16 is opened. Thereby, the pressure in the cylinder chamber 12 is released and the high pressure switching piston 6 can be forced ahead by the oil pressure. Meanwhile, the top of the high pressure switching piston 6 in the forward portion goes through the center opening 7 to disconnect the cylinder chamber 8 and the cylinder chamber 9. When the above-mentioned switching piston 6 is stopped at the forward position, the check valve 17 in the head of the piston 6 is opened by the increase of the internal pressure in the cylinder chamber 11 and the pressure oil goes into the cylinder chamber 9 through the oil passage 10 in the piston 6. Thereby, the high pressure mold clamping ram 4 is pushed tightly to clamp the set of the mold. (See FIG. 3)

Thus the injection of thermoplastic resin is then carried out, and after the completion of the injection of resin, the mold is opened by retracting the high pressure mold clamping ram 4 in the following manner. In the first place, the aforementioned change-over valve A and the high pressure change-over valve B are turned at the same time or beginning with the valve A. Thus the circuits of a → T and P → b are formed in the valve A, and the circuit of c → T is formed in the valve B. By these changes of the valves, the pilot check valve 16 is closed, the supply of the pressure oil into the cylinder chamber 11 is stopped, and the high pressure switching check valve 17 is closed to stop the oil passage 10. The pressure oil from the change-over valve A is supplied into both the cylinder chamber 14 of the high pressure mold clamping cylinder 1 and the cylinder chamber 12 of the high pressure switching cylinder 3 to retract the mold clamping ram 4. At the same time, the switching piston 6 is forced back by the pressure oil in the cylinder chamber 9 caused by the retraction of the mold clamping ram 4, thereby the cylinder chamber 8 and the cylinder chamber 9 are interconnected through the opening 7, thus the low pressure piston 5 is forced back by the pressure oil in the chamber 8. Accordingly, when the high pressure mold clamping ram 4 is retracted by the oil pressure in the cylinder chamber 14, other pistons are forced back simultaneously to provide for the next series of operation.

The clamping mechanism of another embodiment as shown in the FIGS. 4 to 7 are that the pressure oil system is simplified as compared with the former embodiment, in which the high pressure mold clamping cylinder 1, the high speed mold closing cylinder 2, the high pressure switching cylinder 3, the high pressure mold clamping ram 4, the high speed mold closing low pressure piston 5 and the high pressure switching piston 6 are the same as those of the former embodiment as shown in FIGS. 1 to 3. In the pressure oil system, the aforementioned pilot check valves 15 and 16 are omitted in this embodiment. That is, the change-over valve A is connected directly to the clamping cylinder 1 and the closing cylinder 2, and the change-over valve B is connected directly to the switching cylinder 3. In the operation as shown in FIG. 5, the change-over valve A is turned to form the circuits of P → a and b → T to force ahead the high speed mold closing piston 5. Thereby, the mold is closed. Next, as shown in FIG. 6, the mold is clamped with a high pressure. The change-over valve B is turned to form a circuit of P → c, and the pressure oil pushes forward the high pressure switching piston 6. The mold opening is carried out as shown in FIG. 7, in which the circuits of d → T and P → e are formed in the change-over valve A and the circuit of f → T is formed in the change-over valve B, thereby the mold clamping ram 4 and the low pressure mold closing piston 5 are retracted and then the switching piston 6 is forced back by the retraction of the low pressure mold closing piston 5.

Further, another embodiment as shown in FIG. 8 is one in which the low pressure mold closing piston 5 in the first embodiment is somewhat modified. That is, said piston 5 is provided with a pair of plungers 30, 30, and the piston 5 is forced ahead or back by the reciprocating motion of said plungers 30, 30. The pressure oil circuit P → a in the change-over valve A is interconnected with the cylinders 31, 31 of said plungers 30, 30.

In the mechanism of the present invention, the high speed mold closing piston is forced ahead by the oil pressure to pressurize the pressure oil in the cylinder chamber 8, and the mold clamping ram 4 is forced ahead rapidly by the pressure in said chamber 8, and in addition to that, the pressure oil is supplied into the cylinder chamber 9 through the large opening 7, therefore the minus pressure portions are not caused to form. Further, after the rapid mold closing, the pressure oil is supplied through the oil passage 10 of switching piston 6, therefore the tight clamping of the mold clamping ram 4 can be carried out effectively and satisfactorily without fail. Therefore, the mold closing and clamping can be carried out rapidly and tightly by employing the mechanism of the present invention.

It should be emphasized, however, that the specific embodiments described and shown herein are intended as merely illustrative and in no way restrictive of the invention.

What is claimed is:

1. A mold clamping mechanism of injection molding machine in which a high pressure mold clamping cylinder, a low pressure high speed mold closing cylinder and a high pressure switching cylinder are arranged in a series relation, said mold clamping cylinder and mold closing cylinder are interconnected with each other by way of an opening to pass the pressure oil, the forward portion of a high pressure switching piston in said switching cylinder is inserted through said opening to close and open said opening, a mold clamping ram in said high pressure mold clamping cylinder is forced ahead to close the mold by advancing a low pressure high speed mold closing piston in said mold closing cylinder, and said clamping ram is pushed by the supply of pressure oil through a passage in said switching piston to clamp the mold tightly.

2. A mold clamping mechanism of injection molding machine as claimed in claim 1, in which said high pressure mold clamping ram is connected with the movable platen, said opening to pass through the pressure oil is formed on the wall between said mold clamping cylinder and said mold closing cylinder at the position corresponding to the center of said mold clamping cylinder head, the stroke of said low pressure closing piston is smaller than the stroke of said mold clamping ram, said mold clamping cylinder is formed integrally with said mold closing cylinder, said high pressure switching cylinder is passed through said opening to disconnect said mold clamping cylinder and said mold closing cylinder by filling said opening with the forward end portion of said switching piston, and said switching piston has a switching check valve in the piston head.

3. A mold clamping mechanism of injection molding machine as claimed in claim 2, in which said mold clamping cylinder and switching cylinder are interconnected with a pressure oil circuit having a check valve and the oil pressure of said circuit acts in the direction to retract said mold clamping ram and said switching piston, said pressure oil circuit is further connected with a change-over valve which is connected with the mold closing cylinder, the other side of said switching cylinder is connected with another pressure oil circuit being provided with another high pressure oil change-over valve, and the latter pressure oil circuit is further connected with the former pressure oil circuit by way of a pilot check valve.

4. A mold clamping mechanism of injection molding machine as claimed in claim 2, in which a change-over valve which being connected to the oil pressure source is connected to the side of the mold clamping cylinder as to retract the mold clamping ram and the side of the mold closing cylinder as to advance the mold closing piston, and another change-over valve which being connected to said pressure source is connected with the side of switching cylinder as to advance the switching piston.

5. A mold clamping mechanism of injection molding machine as claimed in claim 1, in which said high speed mold closing low pressure piston is connected with a pair of plungers, and said low pressure piston is moved by said plungers.

* * * * *